(12) United States Patent
Shinya et al.

(10) Patent No.: US 8,087,967 B2
(45) Date of Patent: Jan. 3, 2012

(54) IMAGE DISPLAY DEVICE AND ITS MANUFACTURING METHOD WITH PARTICULAR LIGHT-HEAT-CURING RESIN COMPOSITION

(75) Inventors: Yoshihisa Shinya, Kanuma (JP); Kenji Kamiya, Kanuma (JP); Yusuke Kamata, Kanuma (JP)

(73) Assignee: Sony Chemical & Information Device Corporation, Tokyo (JP)

( * ) Notice: Subject to any disclaimer, the term of this patent is extended or adjusted under 35 U.S.C. 154(b) by 520 days.

(21) Appl. No.: 12/309,106

(22) PCT Filed: Jul. 16, 2008

(86) PCT No.: PCT/JP2008/062852
§ 371 (c)(1),
(2), (4) Date: Jan. 24, 2009

(87) PCT Pub. No.: WO2009/011366
PCT Pub. Date: Jan. 22, 2009

(65) Prior Publication Data
US 2009/0186552 A1     Jul. 23, 2009

(30) Foreign Application Priority Data

Jul. 17, 2007  (JP) ................................. 2007-186360
Apr. 14, 2008  (JP) ................................. 2008-105055
Nov. 1, 2008   (JP) ................................. 2008-005027

(51) Int. Cl.
*H01J 9/00*    (2006.01)
*G02F 1/1333*  (2006.01)
*G02F 1/1339*  (2006.01)

(52) U.S. Cl. ........... 445/58; 349/158; 349/153; 349/190
(58) Field of Classification Search .................. 445/58; 349/158, 153, 190
See application file for complete search history.

(56) References Cited

U.S. PATENT DOCUMENTS

| 6,686,031 B2 * | 2/2004 | Matsufuji et al. | 428/212 |
| 2010/0097552 A1 * | 4/2010 | Shinya et al. | 349/122 |
| 2010/0210812 A1 * | 8/2010 | Urakawa et al. | 528/364 |

FOREIGN PATENT DOCUMENTS
JP     2005055641 A *  3/2005

* cited by examiner

*Primary Examiner* — Mike Qi
(74) *Attorney, Agent, or Firm* — Manabu Kanesaka

(57) ABSTRACT

Manufacture a highly reliable image display device capable of proceeding with resin cure even in the case where a protective panel is provided with a light shielding portion. A liquid crystal display unit 2 having a liquid crystal display panel 8 and a light transmissive protective panel 3 having a light shielding portion 5 are disposed face to face, a resin composition 10 is interposed between the liquid crystal display unit and the protective panel, and the resin composition is cured into a cured resin layer 11. As the resin composition 10, a light-heat-curing resin composition and containing a photopolymerization initiator and organic peroxide of thermal polymerization initiator is used. In curing the resin composition 10, cure by light (ultraviolet rays) irradiation is performed until a cure ratio of the resin composition becomes 30% or more and thereafter thermal cure is performed.

8 Claims, 5 Drawing Sheets

IMAGE DISPLAY DEVICE AND ITS MANUFACTURING METHOD WITH PARTICULAR LIGHT-HEAT-CURING RESIN COMPOSITION

FIELD OF THE INVENTION

The present invention relates to a method for manufacturing image display devices, such as a liquid crystal display (LCD) used for a mobile telephone, for example, and particularly to an improvement in a method for curing a resin composition filled between the device and a protective panel having a light shielding portion.

DESCRIPTION OF THE PRIOR ART

In an image display device, such as a liquid crystal display, in order to prevent impair of an image display panel or protect the surface thereof, a protective panel has been fixed on the front surface of the image display panel. For example, a transparent protective panel, such as a glass panel or a plastic panel, has been incorporated into a box body, with a slight airspace formed between itself and the image display panel via an intervening spacer disposed on the outer periphery of the image display panel.

When such a structure has been adopted, however, the presence of the air-space induces scattering of light to decrease the contrast or luminance, thereby entailing a problem of deteriorating an image appearance quality. In the structure, since the protective panel and air have different refractive indices, reflection is induced at the interface thereof and, particularly outdoors, a difficulty in visibility is made. In addition, the presence of the air-space raises a drawback from the standpoint of resistance to impact.

Under these circumstances, it has been proposed that resin is filled between an image display panel and a protective panel (refer, for example, to Patent Document 1: JP-A 2005-55641). In a liquid crystal display described in Patent Document 1, for example, a spacer is disposed on the periphery of a polarizer attached to the upper surface of a liquid crystal display panel, a surface protective glass plate is mounted on the upper side of the spacer, and an adhesive is filled between the polarizer and the surface protective glass plate so as avoidance air bubbles to enter between them, thus attaching the surface protective glass plate onto the liquid crystal display panel.

DISCLOSURE OF THE INVENTION

Problems the Invention Intends to Solve

In the meantime, in the image display device, such as the liquid crystal display, mentioned above, with an aim to enhance the contrast of an image to be displayed, a frame-shaped light shielding portion of a prescribed width is disposed along the peripheral edge of the protective panel. The light shielding portion has a function to shield unwanted incident light around the liquid crystal display panel and also serves to prevent deterioration of a display appearance quality by light leakage.

In the case where the protective panel is provided with the light shielding portion, however, the resin filled between the image display panel and the protective panel cannot sufficiently receive light to anew cause a problem of resin cure prevention. In a configuration in which the protective panel is disposed on an image display unit having the liquid crystal display panel incorporated into a frame body, and a resin composition to be light-cured is filled between the image display unit and the protective panel, for example, when it is intended to cure the resin composition through light irradiation, the light shielding portion constitutes an obstacle to light irradiation and, in particular, there is a possibility of cure of the resin composition around the light shielding portion proceeding insufficiently. Insufficient resin cure causes the quality of the image display device to be greatly deteriorated, resulting in a decrease in reliability.

The present invention has been proposed in consideration of the conventional state of affairs, and the object thereof is to provide a method that can manufacture an image display device capable of allowing resin cure to proceed sufficiently even when a protective panel is provided with a light shielding portion and high in reliability.

Means for Solving the Problems

To attain the above object, the method for manufacturing an image display device according to the present invention comprises the steps of disposing an image display unit having an image display portion and a light transmissive protective panel having a light shielding portion face to face, interposing a light-heat-curing resin composition between the image display unit and the protective panel, and curing the resin, wherein containing a photopolymerization initiator and an organic peroxide of thermal polymerization initiator is used as the resin composition, and the step of curing the resin composition comprises cure by light irradiation performed until the resin composition has a cure ratio of 30% or more and thermal cure performed after the cure by the light irradiation.

At the position of the protective panel at which the light shielding portion is formed, sufficient light fails to reach the resin composition. Therefore, sufficient cure is difficult to attain only through a light cure. In the present invention, therefore, as a light-heat-curing resin composition to be filled between the image display unit and the protective panel, and both light cure and thermal cure are used concurrently to cure the resin composition into the cured resin substance. Use of the light-heat-curing resin enables a portion not exposed to light to be also cured.

However, when the organic peroxide serving as the thermal polymerization initiator for the thermal cure comes into contact with oxygen in air, it undergoes great cure prevention to allow a phenomenon to occur, in which the light-heat-curing resin composition is not sufficiently cured particularly at the edge thereof. To solve this problem, the present invention performs the cure by the light irradiation until the light-heat-curing resin composition has a cure ratio of 30% or more and then performs the thermal cure. The outer periphery portion to be in contact with oxygen is temporarily cured to form a cured layer on the outside, thereby blocking a contact of the thermal polymerization initiator as organic peroxide contained in the resin composition with oxygen. The subsequently performed thermal cure enables the thermal polymerization initiator to fulfill its function sufficiently and sufficient cure to be realized. At this time, it is important that the initial light cure be performed to what extent. It has experimentally been confirmed that the light cure is performed until the cure ratio of the light-heat-curing resin composition becomes 30% or more to infallibly block the contact of the thermal polymerization initiator with oxygen and that the cure can proceed sufficiently at the subsequent thermal cure.

EFFECTS OF THE INVENTION

According to the present invention, it is possible to manufacture a highly reliable image display device in which the cure of the resin can proceed sufficiently also in the surrounding region of the light shielding portion of the protective panel and the cure ratio of the resin filled between the protective panel and the image display unit is high.

BRIEF DESCRIPTION OF THE DRAWINGS

FIG. 1(a),(b),(c) are schematic cross-sectional views showing a method for manufacturing a liquid crystal display according to one embodiment of the present invention, and FIG. 1(a) showing a step of applying a resin composition, and FIG. 1(b) showing a step of ultraviolet rays irradiation (temporary cure), and FIG. 1(c) showing the configuration of the liquid crystal display assumed after a thermal cure treatment.

FIGS. 3(a),(b),(c) are schematic cross-sectional views showing a method for manufacturing a liquid crystal display according to another embodiment of the present invention, and FIG. 3(a) showing a step of applying a resin composition, and FIG. 3(b) showing a step of ultraviolet ray irradiation (temporary cure) and FIG. 3(c) showing the configuration of the liquid crystal display assumed after a thermal cure treatment.

FIG. 4(a),(b),(c) are schematic cross-sectional views showing a method for manufacturing a liquid crystal display according to still another embodiment of the present invention, and FIG. 4(a) showing a step of applying a resin composition, and FIG. 4(b) showing a step of ultraviolet rays irradiation (temporary cure) and FIG. 4(c) showing the configuration of the liquid crystal display assumed after a thermal cure treatment.

EXPLANATION OF REFERENCE NUMERALS

1 a liquid crystal display device, 2 a liquid crystal display unit, 3 a protective panel, 4 a light transmissive panel, 5 a light shielding portion, 6 a frame, 7 a backlight, 8 a liquid crystal display panel, 9 a spacer, 10 a resin composition, 11 a cured resin layer, 30 an irradiation portion, 31 a UV rays irradiating device, and 32, 33 and 34 ultraviolet rays.

BEST MODE FOR CARRYING OUT THE INVENTION

Embodiments of a method for manufacturing an image display device will be described, with a liquid crystal display used for mobile telephones, mobile game instruments, etc. exemplified.

Figure 1:
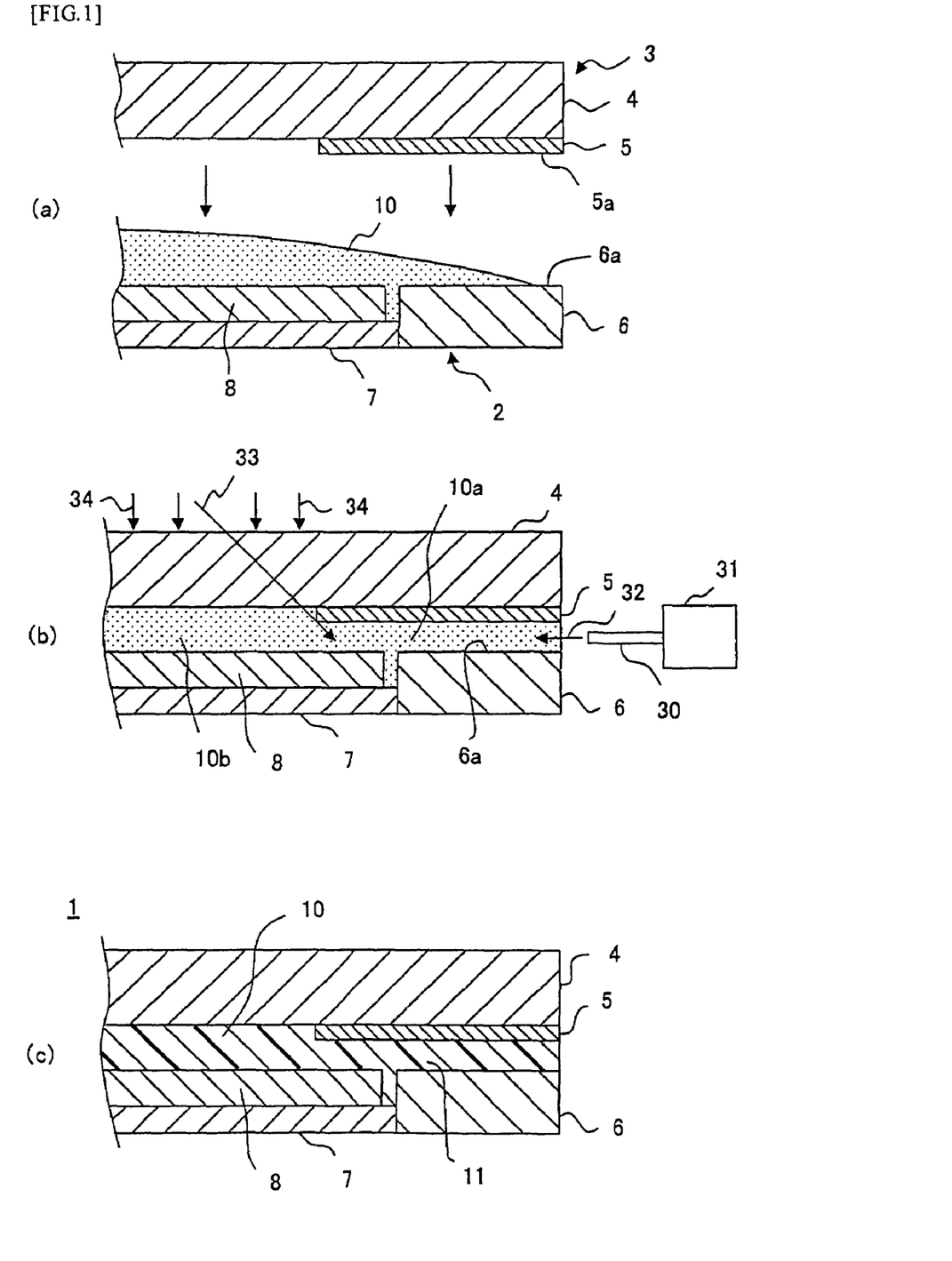

FIG. 1(a) to FIG. 1(c) show a process of applying a protective film in the method for manufacturing a liquid crystal display that is one example of image display devices.

In the liquid crystal display device, a liquid crystal display unit 2 has a frame 6, a liquid crystal display panel (image display section) 8 is installed in an inside region of this frame 6, and a backlight 7 is mounted on a section of the liquid crystal display panel 8 on a backside of the device.

The liquid crystal display panel 8 comprises a pair of substrates and a liquid crystal material sandwiched between the substrates to constitute a liquid crystal layer and displays an image through control of the orientation of the liquid crystal material of the liquid crystal layer. A gap g between the pair of substrates is a so-called cell gap. In addition, one of the pair of substrates (counter substrate) is provided with a color filter or black matrix and a counter electrode, and the other substrate (array substrate) is provided with a pixel electrode or drive transistor. Furthermore, polarization plates are attached to the front and back surfaces of the liquid crystal display panel 8, respectively.

On the other hand, a protective panel 3 to be stacked on the liquid crystal display unit 2 via a cured resin substance is composed predominantly of a light transmissive panel 4 having substantially the same size as the liquid crystal display unit 2. As the light transmissive panel 4, for example, a glass panel made of optical glass or a plastic panel made of plastics (acryl resin etc.) can be used. Incidentally, use of the plastic panel as the light transmissive panel 4 is more advantageous than use of the glass panel from the standpoints of the production cost and the resistance to impact. The glass panel is more expensive and weaker in resistance to impact than the plastic panel. Therefore, a plastic panel made of Polymethyl methacrylate (PMMA) that is one kind of acryl resin, for example, is advantageously used as the light transmissive panel 4.

A black frame-shaped light shielding portion 5 corresponding in position to the peripheral edge of the liquid crystal display panel 8 is provided, for example, on the side of the surface of the light transmissive panel 4 opposed to the liquid crystal display unit 2. The shielding portion is formed on the light transmissive panel 4 through attachment of a light shielding tape or printing of a light shielding paint.

In the present embodiment, in order to laminate the protective panel 3 and the liquid crystal display unit 2 together using a resin composition 10, as shown in FIG. 1A, the resin composition is applied onto the upper surface of the liquid crystal display unit 2. In this case, the procedure thereof may comprise applying the resin composition 10 onto the upper surface of the liquid crystal display unit 2 and stacking the protective panel 3 on the applied resin composition, or comprise applying the resin composition 10 onto the protective panel 3 side, turning the protective panel 3 upside down and stacking the protective panel 3 on the liquid crystal panel 2.

The application of the resin composition 10 can be attained by dropping a prescribed amount of the resin composition 10 onto the liquid crystal display unit 2, for example. The amount of the resin composition 10 to be dropped is preferably determined so that the thickness of a cured resin layer 11 formed after laminating the protective panel 3 and the liquid crystal display unit 2 together may be in the range of around 50 μm to around 250 μm.

As the resin composition 10, a resin capable of being light-cured and thermally cured is used and a resin composition exhibiting low shrinkage by cure and low elasticity is preferably used in order to reduce the generation of internal stress at the time of cure. When the resin composition filled between the liquid crystal display unit 2 and the protective panel 3 is subjected to cure, for example, the internal stress generated by volume shrinkage during cure of the resin composition 10 is exerted on the image display panel. In the case of the liquid crystal display unit 2 equipped with the liquid crystal display panel 8, when the internal stress has been exerted on the liquid crystal display panel 8, the cell gap of the liquid crystal layer is fluctuated on the order of nanometer to cause display blur. A possibility of such a problem being posed can be suppressed when a resin composition exhibiting low shrinkage by cure and low elasticity has been used as the resin composition 10.

To be specific, the rate of shrinkage of the resin composition 10 by cure is preferably 5% or less, more preferably 4.5% or less, much more preferably 4.0% or less, and most preferably in the range of 0 to 2%. By using the resin composition adjusted to have the rates of shrinkage, it is possible to reduce the internal stress accumulated in the cured resin layer 11 during cure of the resin composition 10 and prevent distortion that may otherwise remain intact at the interfaces of the cured resin layer 11 with the liquid crystal display panel 8 and with the protective panel 3.

In addition, the resin composition 10 is preferably adjusted so that the storage elastic modulus (25° C.) of the cured resin layer 11 may have an appropriate value. For example, the storage elastic modulus (25° C.) of the cured resin layer 11 is preferably $1 \times 10^7$ Pa or less, more preferably in the range of $1 \times 10^3$ Pa to $1 \times 10^6$ Pa. By setting the storage elastic modulus (25° C.) of the cured resin layer 11 to be in the above range, it is possible to reduce the stress to be exerted onto the liquid crystal display panel 8.

Generally, when resin compositions have the same principal resin components, but further contain different resin components or different monomer components, the storage elastic modulus (25° C.) of the cured resin layers may possibly exceed $1 \times 10^7$ Pa. The resin components forming such cured resin layers are not used as the resin component 10.

Incidentally, the degree of the internal stress accumulated in the cured resin layer 11 formed when the resin composition 10 has been cured can also be evaluated by the mean surface roughness of cured resin substances formed by dropping a resin composition onto a flat plate and curing the dropped resin composition. When 2 mg of a resin composition has been dropped onto a glass plate or acryl plate and cured at a cure ratio of 90% or more by the irradiation of ultraviolet rays, if the mean surface roughness of the cured resin substances obtained is 6.0 nm or less, the distortion generated at the interface of the cured resin substance with the liquid crystal display panel 8 or protective panel 3 can be reduced to a level practically ignorable. More preferable mean surface roughness is 5.0 nm or less and most preferable one is in the range of 1 to 3 nm. By using the resin composition capable of acquiring the above mean surface roughness, it is possible to practically ignore the distortion generated at the interface of the cured resin substance.

Here, as the glass plate used for the evaluation of the internal stress, a glass plate used for sandwiching liquid crystals of liquid crystal cells or used as a protective plate for the liquid cells can be used. As the acryl plate, a plate used as a protective plate for the liquid cells can be used. The mean surface roughness the glass plate or acryl plate has is generally 1.0 nm or less.

The resin composition 10 is required to have excellent optical characteristics, besides the low shrinkage by cure and low elasticity. In terms of the refraction index, for example, the cured resin layer 11 formed in consequence of cure of the resin composition 10 preferably has the same refraction index as the protective panel 3. Therefore, the cured resin layer 11 preferably has a refraction index of 1.45 or more and 1.55 or less, more preferably 1.51 or more and 1.52 or less and is further required to have transparency. When the cured resin layer 11 has a thickness of 100 μm, the light transmission in a visible light wavelength region is preferably 90% or more.

The resin composition that can satisfy the above conditions comprises an oligomer or polymer, an acrylate monomer, a photopolymerization initiator and a thermal polymerization initiator as principal components, and other additives including sensitizers, plasticizers and transparent particles in an amount satisfying the above solid state properties.

Examples of the oligomer or polymer usable include polyurethane acrylate, polybutadiene acrylate, polyisoprene acrylate or the esterification products thereof, hydrogenated terpene resins, butadiene polymers and epoxy acrylate oligomer.

Usable as the acrylate monomer are isobornyl acrylate, dicyclopentenyl oxyethyl methacrylate, hydroxymethyl methacrylate, hydroxypropyl methacrylate, hydroxybutyl methacrylate, lauryl acrylate and benzyl acrylate.

As the photopolymerization initiator usable, 1-hydroxy-cyclohexyl-phenyl-ketone (produced by Ciba Specialty Chemicals Inc. under the trade name IRGACURE), 2-hydroxy-1-{4-[4-(2-hydroxy-2-methyl-propionyl)-benzyl]-phenyl}-2-methyl-prop ane-1-one (produced by Ciba Specialty Chemicals Inc. under the trade name IRGACURE 127) and 1-hydroxy-cyclohexyl-phenyl-ketone (produced by Ciba Specialty Chemicals Inc. under the trade name DAROCUR 1173) can be used. However, these products are by no means limitative.

Incidentally, in many cases, the protective panel 3 is given a function to shield light in the ultraviolet range from the standpoint of protecting the liquid crystal display panel 8 from ultraviolet rays. For this reason, a photopolymerization initiator (made by Nihon SiberHegner K.K. under the trade name Speed Cure TPO, for example) curable by means of light in the visible light region is preferably used concurrently.

Organic peroxides serving to initiate polymerization by heat can be used as the thermal polymerization initiator. In the organic peroxide that is a thermal polymerization initiator, though a 10-hour half-life temperature constitutes an index a curing temperature, in view of the fact that a plastic material, such as acryl resin, is used for the protective panel 3, organic peroxide having a relatively low 10-hour half-life temperature is preferably used. Since the heatproof temperature of the plastic material, such as acryl resin, is around 80° C., the preferable 10-hour half-life temperature of organic peroxide used as the thermal polymerization initiator is preferably 100° C. or less. Here, the term half-life period of the organic peroxide means the time spent until the concentration of the organic peroxide is reduced to a half the initial value, and the temperature at which 10 hours are required until the half-life period is called the 10-hour half-life temperature.

As the thermal polymerization initiator of organic peroxide having a 10-hour half-life temperature of 100° C. or less, $C_{12}H_{24}O_3$ (produced by Nippon Oils & Fats Corporation under the trade name PERBUTYL O, and produced by Nippon Oils & Fats Corporation under the trade name PERROYL TCP) can be used.

In the resin composition containing the aforementioned components, the kind, ratio, etc. of the oligomer, polymer, acrylate monomer, photopolymerization initiator, thermal polymerization initiator and other additives may be adjusted so that the values of the rate of shrinkage by cure, storage elastic modulus and optical characteristics may fall within the aforementioned ranges, respectively. In addition, the amount of the thermal polymerization initiator to be mixed is preferably in the range of 1 weight % to 10 weight % of the amount of acryl resin (total amount of the oligomer or polymer and acrylate monomer) in the resin composition from the standpoint of securing proper reaction temperature and reaction time.

After applying the resin composition 10, the protective panel 3 is mounted thereon as shown in FIG. 1(b) to fill the resin composition 10 between the protective panel 3 and the liquid crystal display 2 (liquid crystal display panel 8 and frame 6) without forming any gap.

Next, though the resin composition 10 is cured, in this cure, temporary cure by light irradiation (ultraviolet irradiation) is first performed. Particularly, the portion of the resin composition 10 (outer peripheral portion) to be in contact with oxygen in air is subjected to this temporary cure to bring the portion to a state forming a cured film and, as a result, is prevented from contact with oxygen and does not come into direct contact with oxygen.

Figure 2:
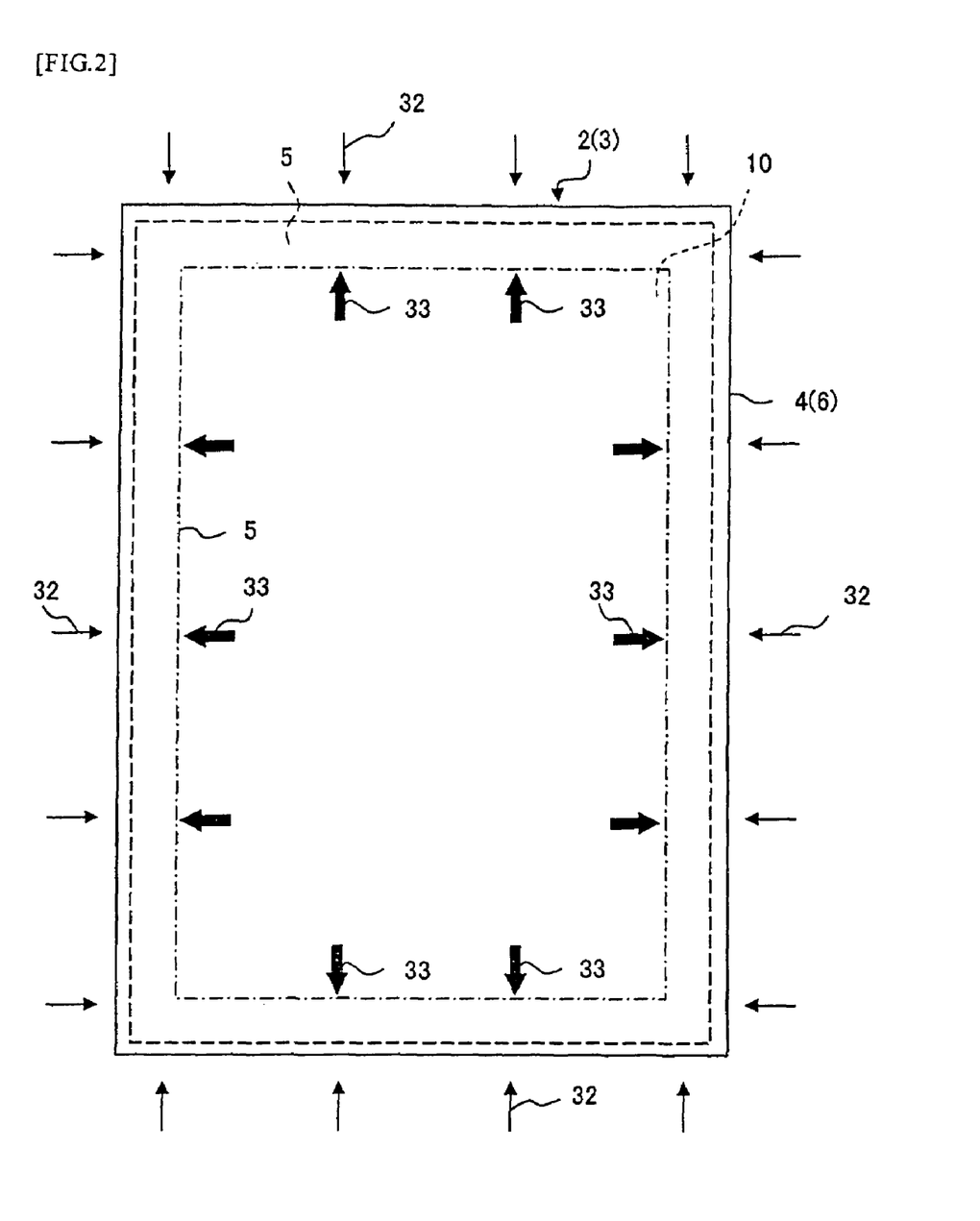
FIG. 2 is a schematic plan view showing an aspect of the ultraviolet rays irradiation in the embodiment shown in FIG. 1(b).

The temporary cure is required particularly at the outer peripheral portion of the liquid crystal display unit 2 on which the protective panel 3 is stacked and, as shown in FIG. 1(b) and FIG. 2, an ultraviolet (UV) irradiation device 31 having a minute irradiation portion 30 comprising optical fibers, for example, is used to irradiate ultraviolet rays 32 from externally sideways and substantially in parallel to a lamination face 5a of the light shielding portion 5 toward an intervening resin composition 10a between the light shielding portion 5 and the liquid crystal display unit 2 (i.e. the resin composition existing in the region in which the light shielding portion 5 is formed).

Though the direction of the irradiation of the ultraviolet rays 32 is not particularly limited and may form an angle in the range of 0° or more and less than 90° relative to the horizontal direction, in view of the object to form the cured film at the end (exposed surface) of the intervening resin composition 10a existing in the region in which the light shielding portion 5 is formed, the ultraviolet rays 32 are preferably irradiated substantially in parallel to a lamination face 6a of the frame 6 of the liquid crystal display unit 2 or the lamination face 5a of the light shielding portion 5.

In addition, in temporarily curing the resin composition 10, besides the irradiation of ultraviolet rays from externally sideways, ultraviolet rays 34 may be irradiated via the light transmissive panel 4 onto a resin composition 10b existing in a region in which the light shielding portion 5 is not formed (a region corresponding to an image display region of the liquid crystal display panel 8, for example). Though the direction of the irradiation of the ultraviolet rays 34 is not particularly limited, preferably it is a direction substantially orthogonal to the surface of the light transmissive panel 4 from the standpoint of attaining more homogenous cure of the resin composition 10b existing in the image display region.

Furthermore, in addition to the irradiation of the ultraviolet rays 34, as shown in FIG. 1(b) and FIG. 2, another ultraviolet irradiation device not shown is used to enable irradiating ultraviolet rays 33 via the light transmissive panel 4 from inside the light shielding portion 5. In this case, the direction of the irradiation of the ultraviolet rays 33 preferably forms an angle in the range of 10° to 45° from obliquely upward relative to the lamination face 6a of the frame 6 of the liquid crystal display unit 2 or the lamination face 5a of the light shielding portion 5 of the protective panel 3 in consideration of the irradiation effect of the ultraviolet rays 33 relative to the resin composition 10a between the light shielding portion 5 and the liquid crystal display unit 2.

Depending on the intensity of the ultraviolet rays 34 or the width of the light shielding portion 5, it is possible to perform the temporary cure by the irradiation with the ultraviolet rays 34 alone or both the ultraviolet rays 34 and ultraviolet rays 33 without irradiating the ultraviolet rays 32 from externally sideways.

In the temporary cure by the irradiation with the ultraviolet rays, it is important to cure the resin composition to what extent. Fundamentally, it will suffice if the outermost surface of the resin composition is cured in a constant amount to form a cured film at the outer peripheral portion in contact with oxygen. In the present invention, however, a cure ratio of the resin composition 10 temporarily cured is adopted as an index for indicating the constant cured amount. To be specific, in order for the thermal polymerization initiator of organic peroxide contained in the resin composition 10 having the cured film formed thereon to sufficiently fulfill its function at the time of thermal cure described later, the cure ratio in the temporary cure as light cure by the irradiation with the ultraviolet rays is required to be 30% or more.

Insofar as the cure ratio of the resin composition 10 temporarily cured reaches 30% or more, the cure ratio of even the portion not exposed to light (portion shielded by the light shielding portion 5) will be able to reach 90% or more by the subsequent thermal cure, indicating a highly effective state. When the cure ratio of the resin composition 10 after the temporal cure by the irradiation with the ultraviolet rays has been around 10%, for example, the cure ratio will become up to only around 50% even in consequence of the subsequent thermal cure. In the absence of the thermal polymerization initiator, though the light cure enables the cure ratio up to around 50% to be attained by the irradiation with the ultraviolet rays, further cure by thermal cure cannot be expected.

Incidentally, the cure ratio can be calculated from a peak intensity of the cure component contained in the resin composition before the temporary cure (before the irradiation with the ultraviolet rays) and a peak intensity thereof in the resin composition after the temporary cure (after the irradiation with the ultraviolet rays). For example, the cure components (monomer or oligomer) are extracted respectively from the resin composition before the temporal cure (before the irradiation with the ultraviolet rays) and the resin component after the temporal cure (after the irradiation with the ultraviolet rays), and liquid chromatography is used to obtain the respective peak intensities of the cure components. Assuming that the peak intensity of the cure component in the resin composition before the temporal cure (before the irradiation with the ultraviolet rays) is $I_0$ and that the peak intensity of cure component in the resin composition after the temporal cure (after the irradiation with the ultraviolet rays) is $I_1$, the cure ratio can be calculated from the following formula.

$$\text{Cure ratio (\%)} = \frac{I_0 - I_1}{I_0} \times 100 \quad \text{[Formula 1]}$$

After the temporal cure is performed until the cure ratio reaches 30% or more by the irradiation with the ultraviolet rays, complete cure (thermal cure) is performed. The thermal cure of the resin composition 10 is performed by the application of heat. In this case, though the heating temperature is not particularly limited, it is preferably in the range of 60° C. to 100° C. from the standpoint of preventing deformation of the plastic material portion. The heating method, for example, may comprise mounting on a heating stage the liquid crystal display unit 2 having the protective panel 3 laminated thereon with the resin composition 10 and heating the entire resin composition 10. Otherwise, a heater may be disposed in the region in which the light shielding portion 5 is formed around the liquid crystal display panel 8.

As described above, the temporary cure by ultraviolet irradiation and the complete cure by heat enable both the resin composition 10b in the image display region and the resin composition 10a in the light shielding portion 5 formation region to be cured sufficiently into the cured resin layer 11, thereby making it possible to obtain a target liquid crystal display 1.

In the liquid crystal display 1 thus obtained, since the light-heat-curing resin composition 10 is used for laminating the liquid crystal display unit 2 and the protective panel 3 and since the thermal cure is performed after the temporal cure by ultraviolet irradiation (to attain the cure ratio of 30% or more), the function of the organic peroxide that is the thermal polymerization initiator can be maintained and the sufficiently high cured state can be obtained without undergoing cure prevention by oxygen. Therefore, it is possible to eliminate quality deterioration by a remaining uncured resin composition and provide the liquid crystal display 1 high in reliability.

In addition, by using the resin composition 10 having the specific solid state properties, the affection of stress on the liquid crystal display panel 8 and protective panel 3 at the time of the resin shrinkage by the cure can be suppressed to the minimum, and little distortion is generated in the liquid crystal display panel 8 and protective panel 3. As a result, no deformation is given to the liquid crystal display panel 8 and the cell gap is maintained constant, resulting in enabling image display having no defective indication, high luminance and high contrast. Furthermore, by interposing between the liquid crystal display panel 8 and the protective panel 3 the cured resin layer 11 having the resin composition 10 cured, it is possible to provide the liquid crystal display resistant to impact and thinner than a conventional liquid crystal display having a space not filled with resin.

Though the embodiment of the present invention has been described above, it goes without saying that the present invention is not limited to the embodiment and that various modifications can be given to the embodiment without departing from the gist of the present invention.

Figure 3:
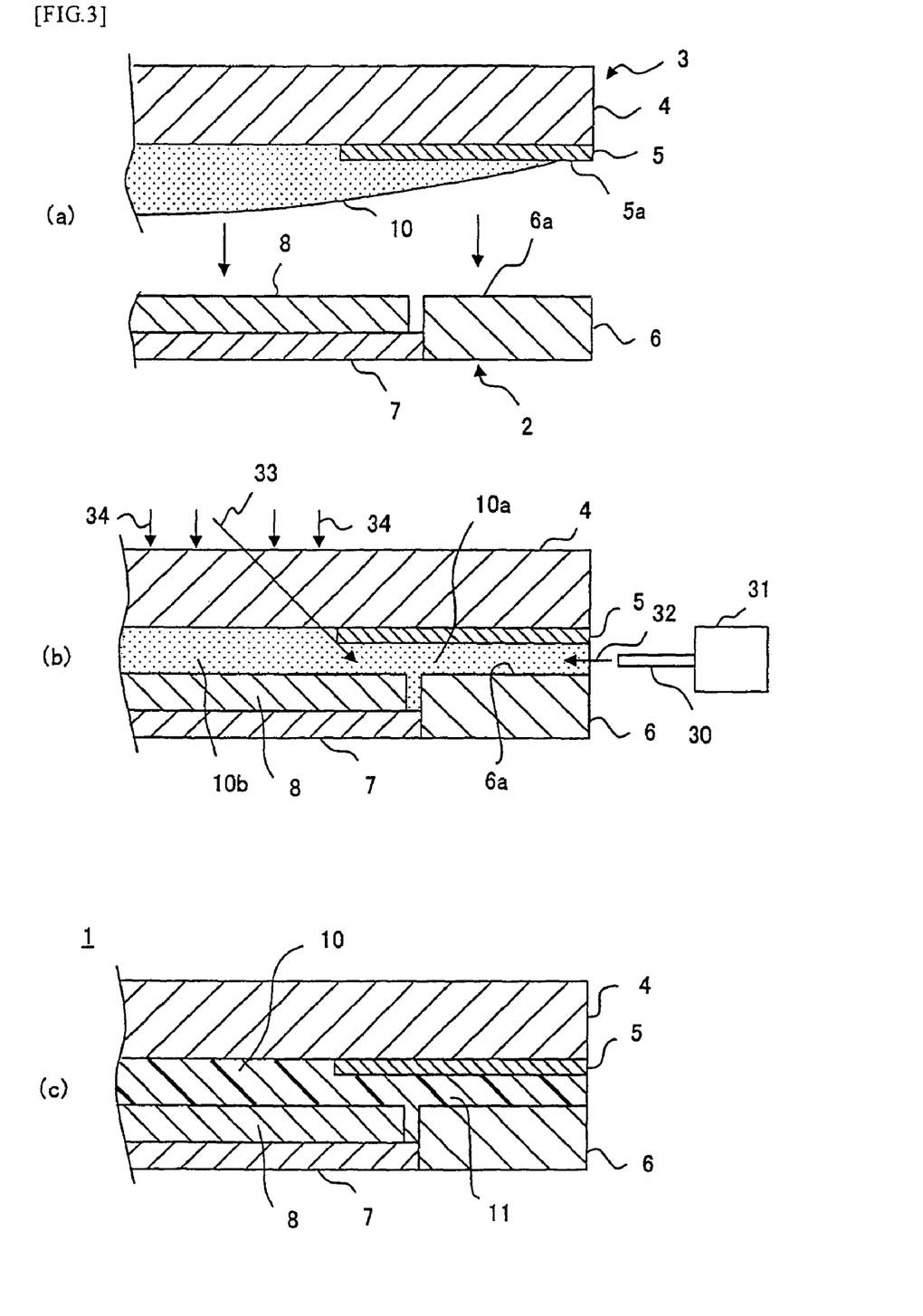

The above embodiment has adopted the structure in which the resin composition 10 is dropped onto the liquid crystal display unit 2 side and the protective panel 3 is stacked thereon. However, as shown in FIG. 3(a), for example, the resin composition 10 may be dropped in a prescribed amount onto the protective panel 3, and the protective panel is then turned upside down and stacked on the liquid crystal display unit 2. In this case, the temporary cure (light cure) as shown in FIG. 3(b) or thermal cure can be performed in the same manner as the previous embodiment and, as shown in FIG. 3(c), the liquid crystal display 1 obtained is the same as that in the previous embodiment.

Figure 4:
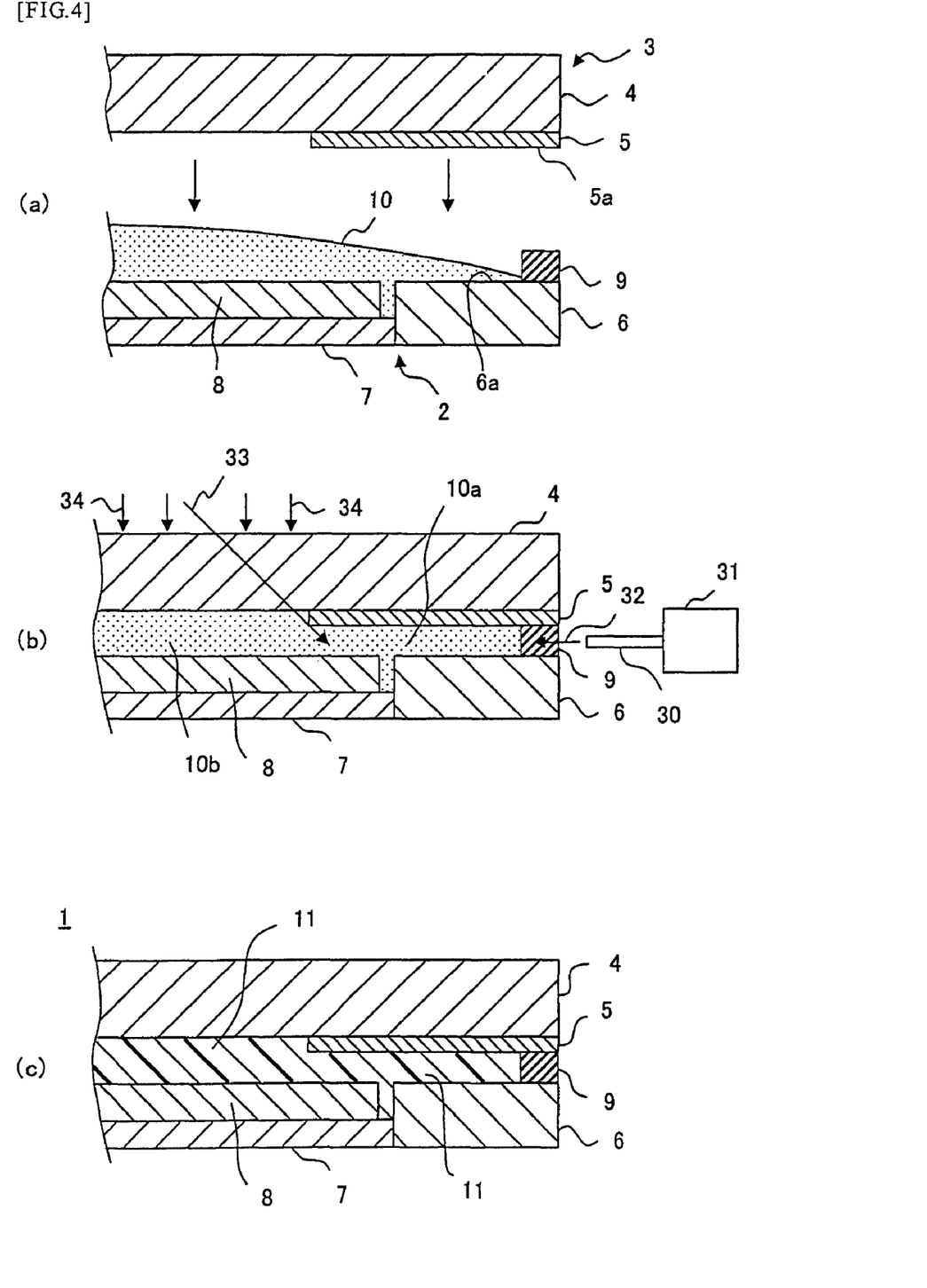

Otherwise, as shown in FIG. 4(a), spacers 9 may be disposed on the periphery of the liquid crystal display unit 2 when the protective panel 3 is stacked via the resin composition 10 on the liquid crystal display unit. The spacers 9 have a height of around 0.05 mm to around 1.5 mm and, as a result, a gap of around 1 mm can be retained between the liquid crystal display unit 2 and the protective panel 3.

Figure 5:
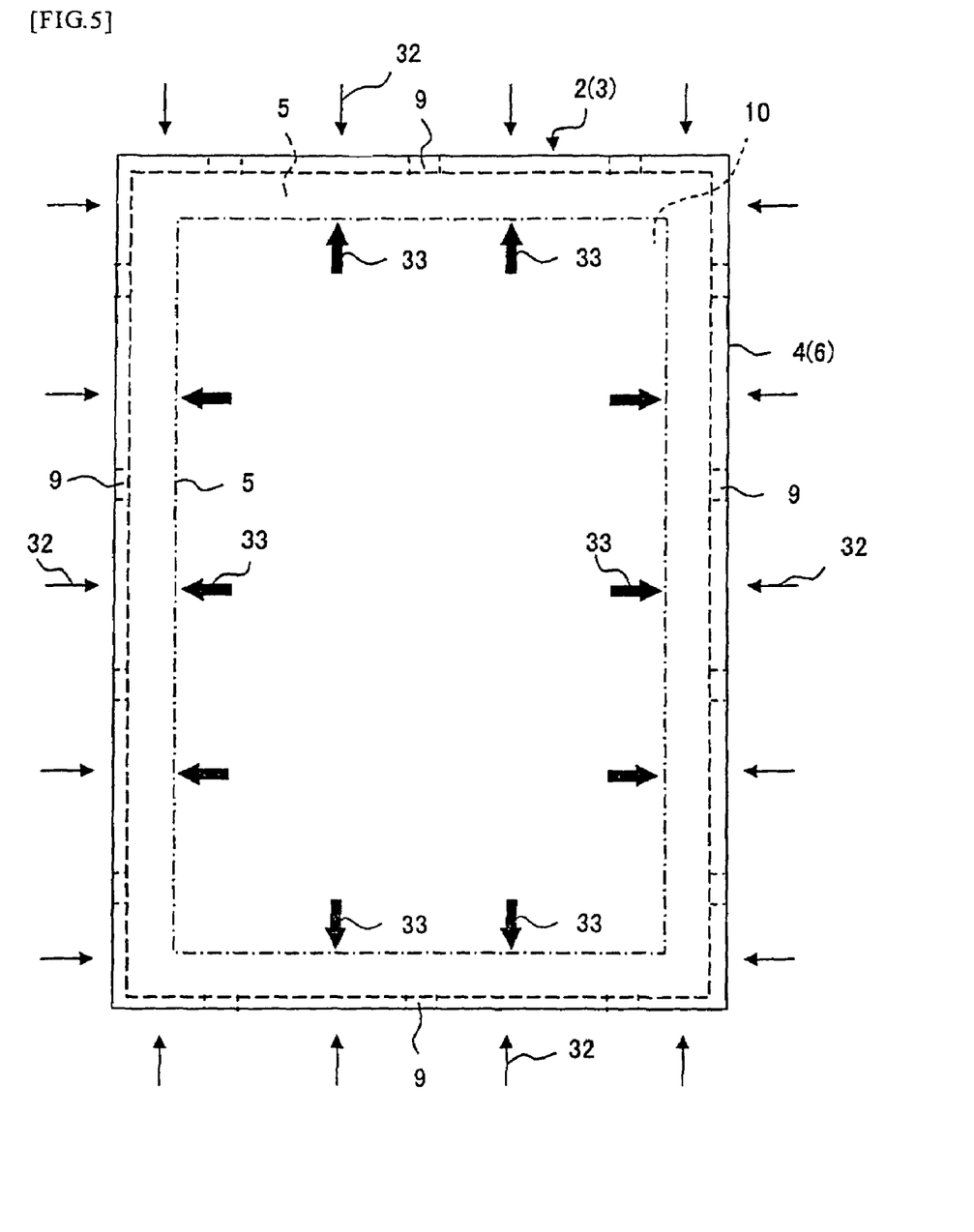
FIG. 5 is a schematic plan view showing an aspect of the ultraviolet rays irradiation in the embodiment shown in FIG. 4(b).

The spacers 9 are equidistantly disposed on the periphery of the liquid crystal display unit 2 (or protective panel 3) at prescribed intervals as shown in FIG. 5. Therefore, the edge parts of the resin composition in the regions between the spacers are in contact with oxygen (air), and temporary cure by ultraviolet irradiation is required. Also, in this case, the light cure and thermal cure are performed after dropping and applying the resin composition 10 as shown in FIG. 4(a). The temporal cure (light cure) shown in FIG. 4(b) or thermal cure can be performed in the same manner as in the previous embodiment and, as shown in FIG. 4(c), the liquid crystal display 1 thus obtained is the same as those in other embodiments except for the presence of the spacers 9.

Though the embodiments of the present invention are directed to the liquid crystal display, the present invention can be applied other devices than the liquid crystal display, such as an organic EL display and a plasma display.

EXAMPLES

Next, concrete examples of the present invention will be described based on experimental results.

Preparation of a Resin Composition to be Light-Cured and Thermally Cured:

Seventy parts by weight of an esterification product of a polyisoprene polymer added with a maleic anhydride adduct and 2-hydroxyethyl methacrelate, 30 parts by weight of dicyclopentenyl oxyethyl methacrylate, 10 parts by weight of 2-hydroxybutyl methacrylate, 30 parts by weight of hydrogenated terpene resin, 140 parts by weight of a butadiene polymer, 4 parts by weight of a photopolymerization initiator, 0.5 part by weight of a photopolymerization initiator for use in a visible light region and 10 parts by weight of a thermal polymerization initiator (organic peroxide) (produced by Nippon Oils & Fats Corporation under trade name PERBUTYL O) were kneaded with a kneading machine to prepare a resin composition. The rate of shrinkage of the resin composition by cure was 1.8%, and the storage elastic modulus (25° C.) of the cured resin substance obtained by curing the resin composition was $1 \times 10^4$ Pa. In addition, the mean surface roughness of the cured resin substance obtained by dropping 2 mg of the resin composition onto a glass plate and irradiating the resin composition with ultraviolet rays to cure the resin composition at a cure ratio of 90% or more was 2.7 nm. Furthermore, a cured resin substance having a thickness of 100 μm was formed from the resin composition and tested for its transmission in the visible light region with an ultraviolet-visible spectrometer (produced by JASCO Corporation under the trade name V-560). It was found to be 90% or more.

Incidentally, as regards the storage elastic modulus, the elastic modulus (Pa) (25° C.) was measured at a measurement frequency of 1 Hz using a viscoelasticity measuring instrument (produced by Seiko Instruments Inc. under trade name DMS6100). The specific gravities of the resin liquid before cure and the solid after cure were measured using an electronic gravimeter (produced by MIRAGE Co., Ltd.) under the trade name SD-120L), and the rate of shrinkage by cure was calculated from the following formula using the difference of the measured specific gravities.

Rate of shrinkage by cure (%)=(cured substance specific gravity−resin liquid specific gravity)/cured substance specific gravity×100

Curing Test:

The resin composition to be light-cured and thermally cured thus prepared was used and 0.2 g thereof was dropped onto the liquid crystal display unit as shown in FIG. 1(a), and an acryl plate was stacked thereon as the protective panel. Incidentally, the acryl panel serving as the protective panel was provided on the outer periphery thereof with a light shielding portion having a width of 5 mm.

Next, as shown in FIG. 1(b), the temporary cure by ultraviolet irradiation was performed. For the ultraviolet irradiation, a UV lamp (produced by USHIO INC.) was used, with the cumulative quantity of exposure light varied in the range of 200 mJ to 3000 mJ. After the temporary cure, the thermal cure (complete cure) was performed on a heating stage at 80° C. for 60 min.

In the curing process, the cure ratio of the resin composition after the temporary cure (ultraviolet cure) and the cure ratio of the resin composition (cured resin substance) after the complete cure (thermal cure) were measured. The cure ratios of the resin composition before the temporal cure (before the ultraviolet irradiation), the resin composition after the temporal cure (after the ultraviolet irradiation), the cured resin substance after the complete cure (thermal cure) were calculated through extraction of the cured component (monomer or oligomer) and use of liquid chromatography to measure the peak intensity of the cured component. The extraction of the cured component was performed using acetonitrile in an amount capable of attaining that the concentration of the resin composition or cured resin substance became 2 weight %. When the peak intensity of the cured component in the resin composition before the temporal cure (before the ultraviolet irradiation) was expressed as $I_0$, the peak intensity of the cured component contained in the resin composition after the temporal cure (after the ultraviolet irradiation) as $I_1$ and the peak intensity of the cured component contained in the cured resin substance after the complete cure (after the thermal cure) as $I_2$, the cure ratios were calculated from the formulae below. The results thereof were shown in Table 1.

TABLE 1

[Chemical 2]

$$\text{Cure ratio after temporary cure (\%)} = \frac{I_0 - I_1}{I_0} \times 100$$

$$\text{Cure ratio after complete cure (\%)} = \frac{I_0 - I_2}{I_0} \times 100$$

| | Ultraviolet irradiation condition | Cure ratio after temporary cure | Cure ratio after complete cure |
|---|---|---|---|
| Example 1 | 200 mJ | 30% | 90% |
| Example 2 | 500 mJ | 50% | 95% |
| Example 3 | 900 mJ | 70% | 95% or more |
| Comparative example 1 | 100 mJ | 10% | 50% |
| Comparative example 2 (no thermal polymerization initiator) | 3000 mJ | 50% | 50% |

As is clear from Table 1, when the cure ratios after the temporal cure were 30% or more (Examples 1 to 3), highly cured state in which the cure ratios were 90% after the thermal cure could be realized. To the contrary, in Comparative example 1 in which the cure ratio after the temporary cure was less than 30% (10%), the cure ratio after the thermal cure was only around 50%. In addition, in Comparative example 2 in which no thermal polymerization initiator was used, though the cure ratio after the ultraviolet irradiation was around 50%, which after the thermal cure was not enhanced.

What is claimed is:

1. A method for manufacturing an image display device, comprising the steps of comprises the steps of disposing an image display unit having an image display portion and a light transmissive protective panel having a light shielding portion face to face, interposing a light-heat-curing resin composition between the image display unit and the protective panel, and curing the resin, wherein containing a photopolymerization initiator and an organic peroxide of thermal polymerization initiator is used as the resin composition, and the step of curing the resin composition comprises cure by light irradiation performed until the resin composition has a cure ratio of 30% or more and thermal cure performed after the cure by the light irradiation.

2. A method for manufacturing an image display device according to claim 1, wherein the protective panel is a plastic panel.

3. A method for manufacturing an image display device according to claim 1, the thermal polymerization initiator has a 10-hour half-life temperature of 100° C. or less.

4. A method for manufacturing an image display device according to claim 1, wherein the resin composition has a rate of shrinkage of 5% or less by cure and a storage elastic modulus of $1 \times 10^7$ Pa.

5. A method for manufacturing an image display device according to claim 4, the resin composition contains at least one polymer selected from the group consisting of polyurethane acrylate, polyisoprene acrylate or an esterification product thereof, hydrogenated terpene resin and a butadiene polymer, at least one acrylate monomer selected from the group consisting of isobornyl acrylate, dicyclopentenyl oxyethyl methacrylate and 2-hydroxybutyl methacrylate, a photopolymerization initiator and a thermal polymerization initiator.

6. A method for manufacturing an image display device according to claim 1, wherein the light shielding portion is formed along an outer periphery of the protective panel, and the light irradiation is performed relative to the resin composition between the image display unit and the protective panel at least from externally sideways.

7. A method for manufacturing an image display device according to claim 1, wherein the image display portion is incorporated into the image display unit and is a liquid crystal display panel.

8. An image display device manufactured by a method comprising the steps of disposing an image display unit having an image display portion and a light transmissive protective panel having a light shielding portion face to face interposing a resin composition between the image display unit and the protective panel and curing the resin composition into a cured resin substance, wherein a light-heat-curing resin composition and containing a photopolymerization initiator and an organic peroxide of thermal polymerization initiator is used as the resin composition, and the step of curing the resin composition comprises cure by light irradiation performed until the resin composition has a cure ratio of 30% or more and thermal cure performed after the cure by the light irradiation.

* * * * *